US011901716B2

(12) United States Patent
Lefort et al.

(10) Patent No.: US 11,901,716 B2
(45) Date of Patent: Feb. 13, 2024

(54) GASKETLESS RAINPROOF GANGING OF ENCLOSURE

(71) Applicant: ABB Schweiz AG, Baden (CH)

(72) Inventors: Maxime Lefort, Iberville (CA); Yannick Meyngne-Ngoule, Iberville (CA)

(73) Assignee: ABB SCHWEIZ AG, Baden (CH)

( * ) Notice: Subject to any disclaimer, the term of this patent is extended or adjusted under 35 U.S.C. 154(b) by 121 days.

(21) Appl. No.: 17/559,793

(22) Filed: Dec. 22, 2021

(65) Prior Publication Data

US 2023/0198237 A1 Jun. 22, 2023

(51) Int. Cl.
*H02G 3/08* (2006.01)
*H02B 1/28* (2006.01)

(52) U.S. Cl.
CPC .............. *H02G 3/088* (2013.01); *H02B 1/28* (2013.01)

(58) Field of Classification Search
CPC .......... H02G 3/08; H02G 3/081; H02G 3/088; H05K 5/00; H05K 5/02; H05K 5/04; B60R 16/00; B60R 16/02; H01H 9/02; H02B 1/28; H02B 1/30; H02B 1/26
USPC ............. 174/50, 53, 57, 58, 520, 559, 564; 220/3.2–3.9, 4.02; 361/600, 601, 641, 361/679.01
See application file for complete search history.

(56) References Cited

U.S. PATENT DOCUMENTS

| | | | |
|---|---|---|---|
| 4,936,478 A * | 6/1990 | Bozdeck | H02G 3/081 220/3.92 |
| 6,527,302 B1 * | 3/2003 | Gault | F16L 41/03 174/50 |
| 6,761,521 B2 | 7/2004 | McCormack et al. | |
| 7,358,441 B1 | 4/2008 | Seff et al. | |
| 7,446,266 B1 * | 11/2008 | Gretz | H02G 3/06 174/50 |
| 8,242,386 B1 * | 8/2012 | Baldwin | H02G 3/081 174/480 |
| 8,642,885 B2 * | 2/2014 | Davila | H02G 3/086 174/50 |
| 8,867,235 B2 * | 10/2014 | Veillette | H02G 3/083 174/559 |
| 8,952,252 B2 * | 2/2015 | Bugaris | H02B 13/025 174/50 |
| 2006/0000629 A1 | 1/2006 | Johnson et al. | |
| 2006/0000639 A1 | 1/2006 | Lauffer et al. | |
| 2014/0068921 A1 | 3/2014 | Tseng | |

* cited by examiner

*Primary Examiner* — Angel R Estrada
(74) *Attorney, Agent, or Firm* — Greenberg Traurig, LLP

(57) ABSTRACT

A gasketless ganging system includes an enclosure, including a first side, a second side; a first opening, and a second opening; a first ganging member disposed on the first side, including a third opening, a first channel, and a pair of first protrusions; and a second ganging member disposed on the second side, including a fourth opening, a second channel, and a pair of second protrusions. In some embodiments, the enclosure is a first enclosure and a second enclosure, wherein the first side of the first or second enclosure abuts the second side of the other of the first or second enclosure, to adjoin enclosures, wherein the pair of first protrusions abuts the pair of second protrusions to position the second channel within the first channel without contacting the first channel.

17 Claims, 9 Drawing Sheets

GASKETLESS RAINPROOF GANGING OF ENCLOSURE

FIELD

This disclosure relates generally to electrical systems. More particularly, this disclosure relates to a gasketless ganging system for ganging of enclosures, such as, but not limited to, electrical metering module enclosures.

BACKGROUND

Adjoined electrical enclosures commonly have electrical conductors passing from one enclosure to the next through openings on sides of the enclosures. To prevent elemental forces, such as water, from contacting the live electrical components contained in such enclosures, the enclosures generally include a joining bracket with a deformable gasket installed between adjacent enclosures. Installing a bracket with a deformable gasket requires additional manufacturing steps and materials. Furthermore, the gaskets can degrade over time and eventually permit water and other elements to invade the enclosures. Additionally, these deformable gaskets fail to prevent a user from inserting conductive objects, such as a screwdriver, into the gaps between enclosures and contacting the live electrical components. Improved brackets are desirable.

SUMMARY

Embodiments of this disclosure are directed to aligning and ganging multiple enclosures together. The gasketless ganging system includes an enclosure, a first ganging member, and a second ganging member. In some embodiments, the enclosure includes a first, a second side, a first opening disposed on the first side, and a second opening disposed on the second side. In some embodiments, the first ganging member includes a third opening, a first channel disposed at the perimeter of the third opening, and a pair of first protrusions. In some embodiments, the second ganging member can include a fourth opening, a second channel disposed at the perimeter of the fourth opening, and a pair of second protrusion. In some embodiments, the enclosure is a first enclosure and a second enclosure, the first enclosure can be ganged to the second enclosure by abutting the first enclosure to the second enclosure such that the pair of first protrusions of the first ganging member abuts the pair of second protrusions of the second ganging member such that the second channel is positioned within, without coming into contact with, the first channel. In some embodiments, the first channel is formed by a first vertical edge, a first lateral edge, and a second vertical edge of the third opening, and the second channel is formed by a first vertical edge, a first lateral edge, and a second vertical edge of the fourth opening. In some embodiments, the first lateral edge of the third and fourth openings are inclined, such that a first or second vertical edge is longer than the other of the first or second vertical edge of the third and fourth openings. In some embodiments, the first lateral edge of the third and fourth openings is rounded. In some embodiments, an advantage of the present disclosure can be, but not limited to, that the overlapping first channel and the second channel directs water around each of the third opening and the fourth opening, and consequently the first opening and the second opening, when the first enclosure abuts the second enclosure to prevent water from coming into contact with the live electrical components. In some embodiments, the pair of first protrusions can be a first width and the pair of second protrusions can be a second width. Accordingly, the pair of first protrusions and the pair of second protrusions are configured to abut the other of the pair of first protrusions and the pair of second protrusions when multiple enclosures are ganged together to properly position and align adjoining the first ganging member relative to the second ganging member to ensure that the first channel is positioned relative to the second channel. In some embodiments, an advantage of the present disclosure can be, but not limited to, that the first channel overlaps the second channel wherein the second channel is substantially positioned within the first channel to direct water around the third and fourth openings and to prevent water from intruding into the first and second openings of adjoining enclosures.

In some embodiments, a device includes: an enclosure, wherein the enclosure includes: a first side, a second side, a first opening, wherein the first opening is disposed on the first side, a second opening, wherein the second opening is disposed on the second side; a first ganging member, wherein the first ganging member includes: a third opening, a first channel, a pair of first protrusions, wherein the first ganging member is disposed on the first side of the enclosure; and a second ganging member, wherein the second ganging member includes: a fourth opening, a second channel, a pair of second protrusions, wherein the second ganging member is disposed on the second side of the enclosure.

In some embodiments, the third opening and the fourth opening further includes: a lateral edge, wherein the lateral edge of the third opening and a lateral edge of the fourth opening are inclined such that a first end of the lateral edge of the third and fourth openings is higher than a second end of the lateral edge of the third and fourth openings.

In some embodiments, the third opening and the fourth opening further includes: a lateral edge, wherein the lateral edge of the third and fourth openings is rounded.

In some embodiments, the first channel is disposed along a portion of the third opening, and the second channel is disposed along a portion the fourth opening.

In some embodiments, the third opening and the fourth opening further includes: a first vertical edge, a second vertical edge, a first lateral edge, and a second lateral edge, wherein the first vertical edge, the first lateral edge, and the second vertical edge of the third opening are flanged to contiguously form the first channel, wherein the first vertical edge, the first lateral edge, and the second vertical edge of the fourth opening are flanged to contiguously form the second channel.

In some embodiments, the pair of first protrusions is a first pair of first protrusions and a second pair of first protrusions, the first pair of first protrusions and the second pair of first protrusions disposed at opposite ends of the third opening, and the pair of second protrusions is a first pair of second protrusions and a second pair of second protrusions, the first pair of second protrusions and the second pair of second protrusions disposed at opposite ends of the fourth opening.

In some embodiments, the pair of first protrusions extend from the first ganging member at a first width, and the pair of second protrusions extend from the second ganging member at a second width.

In some embodiments, the enclosure includes: a first enclosure, and a second enclosure, wherein the first or second ganging member of the first enclosure is configured to abut the other of the first or second ganging member of the second enclosure. In some embodiments, the pair of first protrusions or the pair of second protrusions of the first enclosure abuts the other of the pair of first protrusions or the pair of second protrusions of the second enclosure to align the first enclosure to the second enclosure, wherein the first channel or the second channel of the first enclosure overlaps the other of the first channel or the second channel of the second enclosure such that the second channel sits in the first opening without contacting the first channel.

In some embodiments, the enclosure further includes: a pair of first receptacles, wherein the pair of first receptacles is disposed at opposite ends of the first opening, a pair of second receptacles, wherein the pair of second receptacles is disposed at opposite ends of the second opening, wherein the pair of first receptacles and the pair of second receptacles are configured to receive a connector to gang the first enclosure to the second enclosure.

In some embodiments, an apparatus includes: an enclosure, wherein the enclosure includes: a first side, wherein the first side includes: a first opening, wherein the first opening is disposed on the first side to expose an interior of the enclosure, a first channel, wherein the first channel is disposed along a circumference of the first opening, and at least two first protrusions, wherein the at least two first protrusions are disposed at opposite sides of the first opening; a second side, wherein the second side includes: a second opening, wherein the second opening is disposed on the second side to expose an interior of the enclosure; a second channel, wherein the second channel is disposed along a circumference of the second opening; at least two second protrusions, wherein the at least two second protrusions are disposed at opposite sides of the second opening.

In some embodiments, the first opening and the second opening further includes: a lateral edge, wherein the lateral edge of the first opening and a lateral edge of the second opening are inclined such that a first end of the lateral edge of the first and second openings is higher than a second end of the lateral edge of the first and second openings.

In some embodiments, the first opening and the second opening further includes: a lateral edge, wherein the lateral edge of the first and second openings is rounded.

In some embodiments, the first channel is disposed along a portion of the first opening, and the second channel is disposed along a portion the second opening.

In some embodiments, the first opening and the second opening further includes: a first vertical edge, a second vertical edge, a first lateral edge, and a second lateral edge, wherein the first vertical edge, the first lateral edge, and the second vertical edge of the first opening are flanged to contiguously form the first channel, wherein the first vertical edge, the first lateral edge, and the second vertical edge of the second opening are flanged to contiguously form the second channel.

In some embodiments, the at least two first protrusions is a first pair of first protrusions and a second pair of first protrusions, the first pair of first protrusions and the second pair of first protrusions disposed at opposite ends of the first opening, and the at least two second protrusions is a first pair of second protrusions and a second pair of second protrusions, the first pair of second protrusions and the second pair of second protrusions disposed at opposite ends of the second opening.

In some embodiments, the at least two first protrusions extend from the first side at a first width, and the pair of second protrusions extend from the second side at a second width.

In some embodiments, the enclosure includes: a first enclosure, and a second enclosure, wherein the first or second side of the first enclosure is configured to abut the other of the first or second side of the second enclosure.

In some embodiments, the at least two first protrusions or the at least two second protrusions of the first enclosure abuts the other of the at least two first protrusions or the at least two second protrusions of the second enclosure to align the first enclosure to the second enclosure, wherein the first channel or the second channel of the first enclosure overlaps the other of the first channel or the second channel of the second enclosure such that the second channel sits in the first opening without contacting the first channel.

In some embodiments, the enclosure further includes: a pair of first receptacles, wherein the pair of first receptacles is disposed at opposite ends of the first opening, a pair of second receptacles, wherein the pair of second receptacles is disposed at opposite ends of the second opening, wherein the pair of first receptacles and the pair of second receptacles are configured to receive a connector to gang the first enclosure to the second enclosure.

BRIEF DESCRIPTION OF THE DRAWINGS

References are made to the accompanying drawings that form a part of this disclosure and that illustrate embodiments in which the systems and methods described in this Specification can be practiced.

Like reference numbers represent the same or similar parts throughout.

DETAILED DESCRIPTION

A "gasketless ganging system" as used herein, includes a system for ganging multiple enclosures together to align and seal the adjoining enclosures. In some embodiments, the gasketless ganging system may be a first and second ganging member. In some embodiments, the gasketless ganging system may include an enclosure. In some embodiments, the gasketless ganging system may be made of metal. In some embodiments, the gasketless ganging system may be made of other materials, including, but not limited to, plastic, silicone, rubber, other alloys, and combinations thereof.

Figure 1:
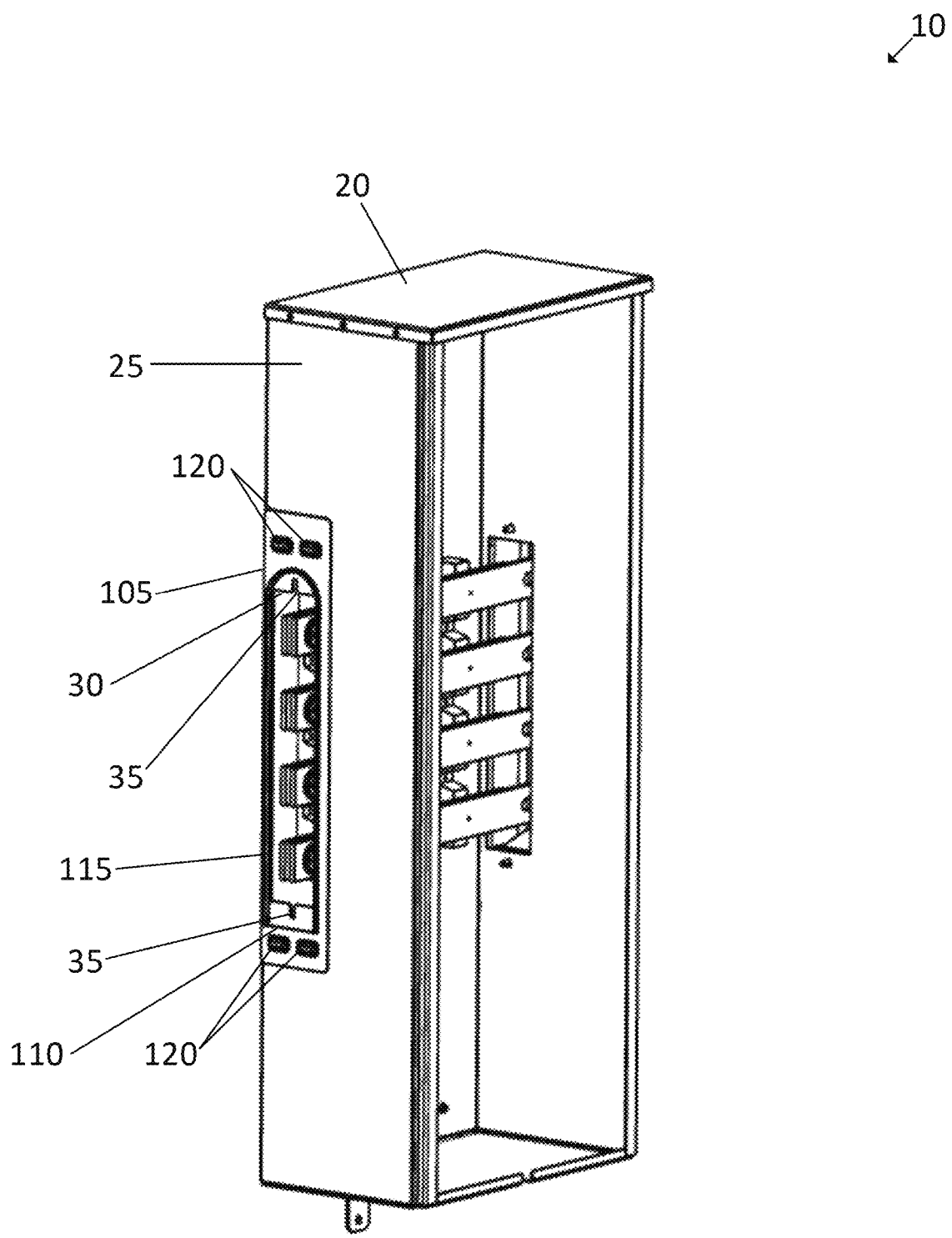
FIG. 1 is a perspective view of a gasketless ganging system including an enclosure and a first ganging member, according to some embodiments.
Figure 2:
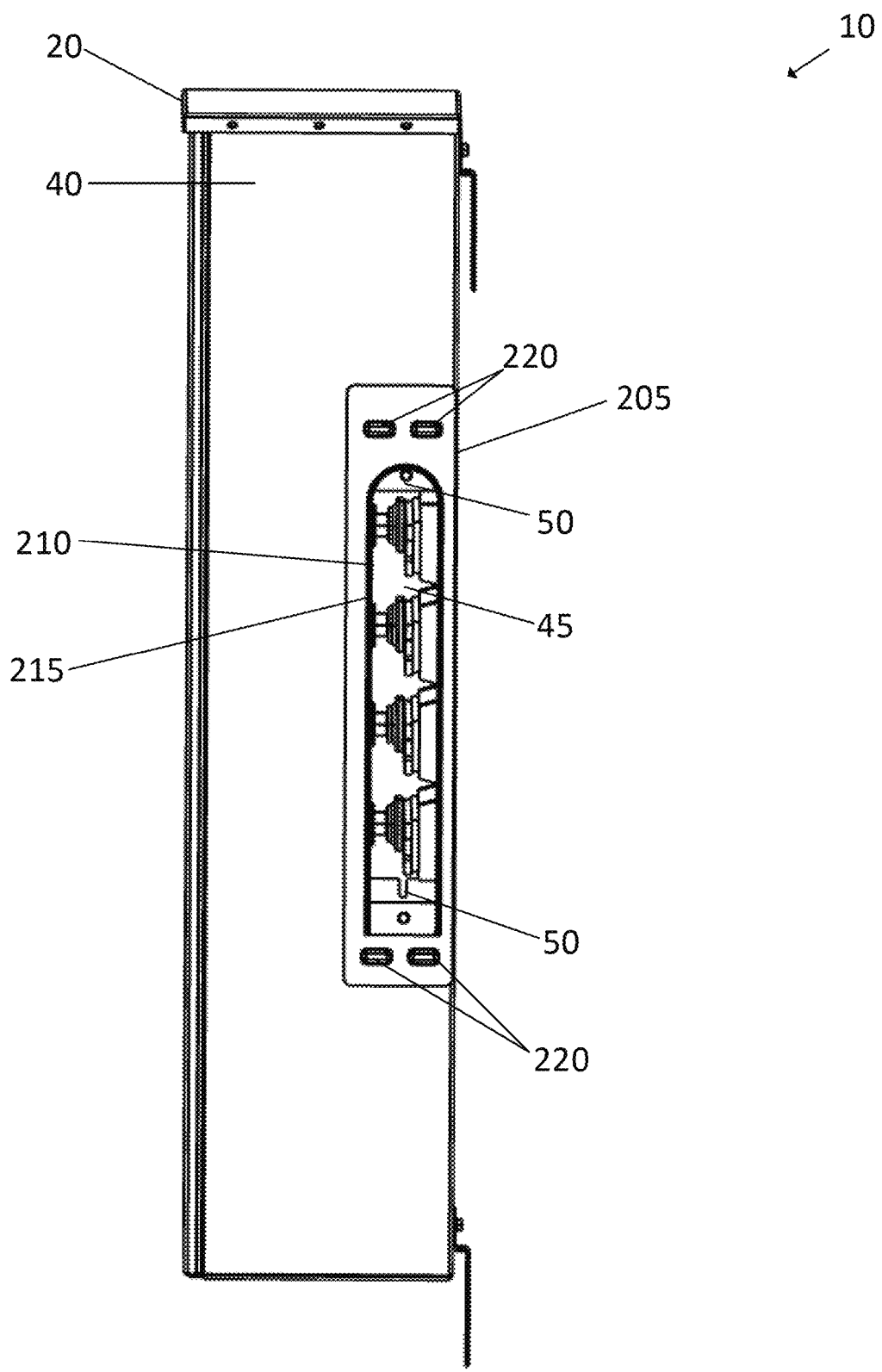
FIG. 2 is a side view of a system including an enclosure and a second ganging member, according to some embodiments.
Figure 3:
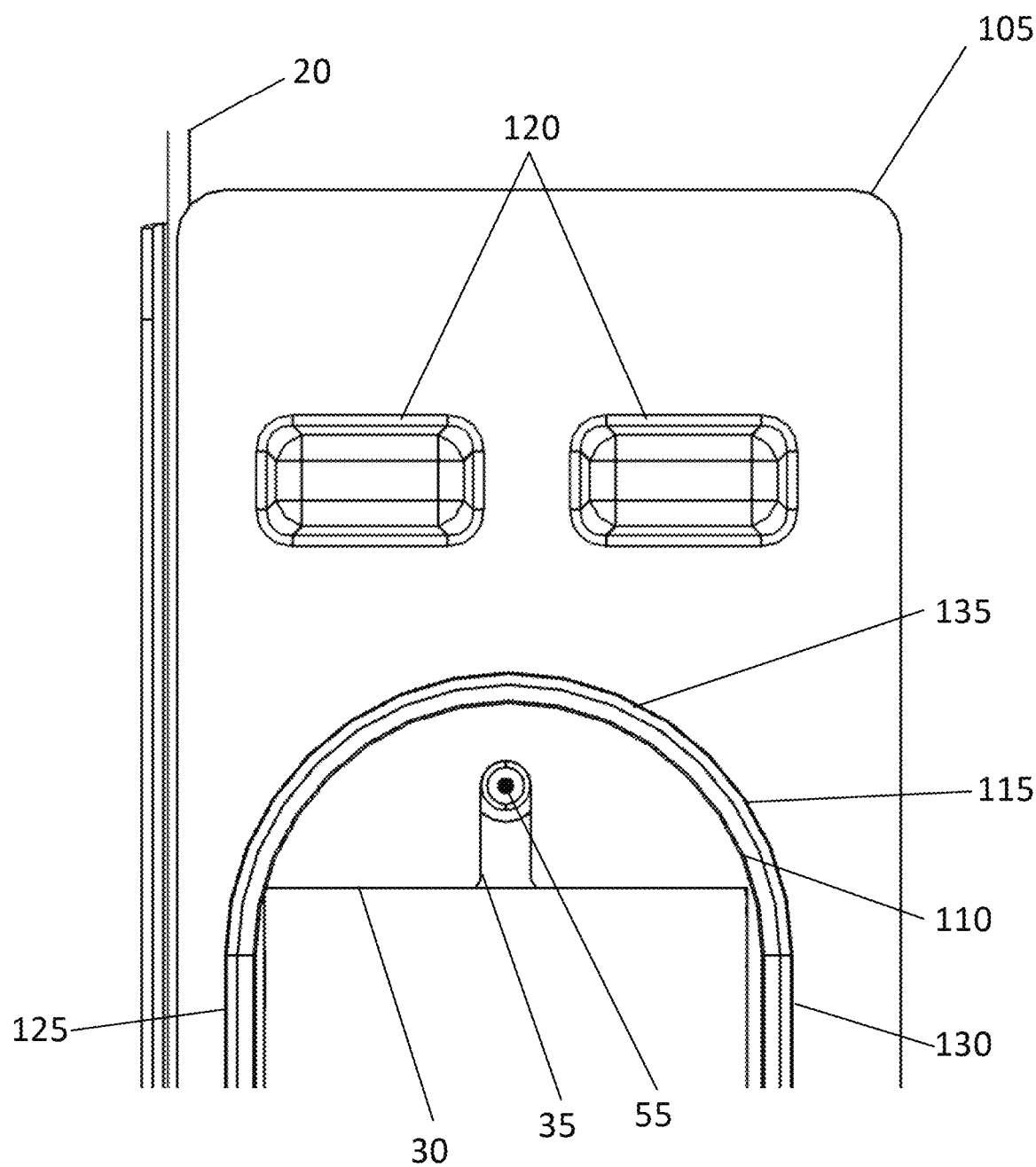
FIG. 3 is a partial front view of the first ganging member and the enclosure, according to some embodiments.

FIGS. 1, 2, and 3 show different views of a gasketless ganging system 10 with a first ganging member 105 and a second ganging member 205. FIG. 1 is a perspective view of a gasketless ganging system 10 including a first ganging member 105, according to some embodiments. FIG. 2 is a side view of a gasketless ganging system 10 including a second ganging member 205, according to some embodiments. FIG. 3 is a side view of the first ganging member 105 and the enclosure 20, according to some embodiments. FIGS. 1-3 will be discussed generally, unless specific reference is made to a particular figure.

In some embodiments, the gasketless ganging system 10 can include an enclosure 20, a first ganging member 105, and a second ganging member 205. The enclosure includes a first side 25, a second side 40, a first opening 30 disposed on the first side 25, and a second opening 45 disposed on the second side 40. The first ganging member 105 can include a third opening 110, a first channel 115, and at least a pair of first protrusions 120, the pair of first protrusions 120 disposed at opposite ends of the third opening 110. The second ganging member 205 can include a fourth opening 210, a second channel 215, and at least a pair of second protrusions 220, the at least a pair of second protrusions 220 disposed at opposite ends of the fourth opening 210.

In some embodiments, the enclosure 20 can include a pair of first receptacles 35 disposed at opposite ends of the first opening 30 and a pair of second receptacles 50 disposed at opposite ends of the second opening 45. In some embodiments, the pair of first receptacles 35 and the pair of second receptacles 50 can be notches disposed on a first lateral edge and a second lateral edge of the first opening 30 and the second opening 45 of the enclosure 20. In some embodiments, the pair of first receptacles 35 and the pair of second receptacles 50 can be a bore extending through the first side 25 and the second side 40 of the enclosure 20. The pair of first receptacles 35 and the pair of second receptacles 50 are configured to receive a connector 55 to gang together adjoining enclosures 20 such that a first ganging member 105 abuts a second ganging member 205. In some embodiments, the connector 55 can include, but not limited to, a screw, nut, bolt, washer, rivet, anchor, cam lock, locking screw, other connectors, and a combination thereof.

In some embodiments, the first ganging member 105 can be attached to the first side 25 of the enclosure 20 wherein the third opening 110 is substantially aligned with the first opening 30 and the pair of first receptacles 35 such that a connector 55 may extend from the pair of first receptacles 35 without contacting the first ganging member 105. The second ganging member 205 can be attached to the second side 40 of the enclosure 20 wherein the fourth opening 210 is substantially aligned with the second opening 45 and the pair of second receptacles 50, such that the connector 55 may extend from the pair of second receptacles 50 without contacting the second ganging member 205. This allows adjoining enclosures 20 to be ganged together by allowing the connectors 55 to pass through each of the third opening 110 and the fourth opening 210.

In some embodiments, the first ganging member 105 and the second ganging member 205 can be made of the same material and have the same material thickness as the enclosure 20. In some embodiments, the first ganging member 105 and the second ganging member 205 can be made of different material and have a different material thickness than the enclosure 20. In some embodiments, the first ganging member 105 and the second ganging member 205 can be steel, aluminum, other alloys, plastic, polymer, silicone, rubber, other materials, and combinations thereof.

In some embodiments, each of the first ganging member 105 and the second ganging member 205 are formed as part of the enclosure 20 during the manufacturing of the enclosure 20. In some embodiments, each of the first ganging member 105 and the second ganging member 205 can be installed onto the enclosure 20 after manufacture, or during installation, of the enclosure 20. In some embodiments, each of the first ganging member 105 and the second ganging member 205 can be installed onto the enclosure 20 by use of a jig that properly aligns the respective first ganging member 105 and second ganging member 205 over the first opening 30 and the second opening 45 of the enclosure 20. In some embodiments, each of the first ganging member 105 and the second ganging member 205 can have aligning pins located on the side of the first ganging member 105 and the second ganging member 205 that contacts the first side 25 and the second side 40 of the enclosure 20. The aligning pins can align with corresponding holes on each of the first side 25 and the second side 40 of the enclosure 20 to ensure each of the first ganging member 105 and the second ganging member 205 are properly positioned when being installed.

In some embodiments, the first ganging member 105 and the second ganging member 205 can be attached to the enclosure 20 by any of a plurality of connecting means, including, but not limited to, rivets, screws, anchors, nuts, bolts, adhesive, welding, other means, and combinations thereof.

In some embodiments, the first ganging member 105 and the second ganging member 205 can have a coating applied to each of the first ganging member 105 and the second ganging member 205 before being attached to the enclosure 20. In other embodiments, the enclosure 20, the first ganging member 105 and the second ganging member 205 are first attached to the enclosure 20 and then a coating is applied to the enclosure 20.

In some embodiments, the gasketless ganging system 10 can include an enclosure 20. The enclosure 20 can include a first side 25, a second side 40, a first opening 30, a second opening 45, a first channel 115, a second channel 215, a pair of first protrusions 120, and a pair of second protrusions 220. In some embodiments, the first opening 30 is disposed on the first side 25 and the second opening 45 is disposed on the second side 40. The first channel 115 is disposed at the first opening 30 and the second channel 215 is disposed at the second opening 45.

In some embodiments, the first channel 115 contiguously runs along a circumference of the first opening 30 and the second channel 215 contiguously runs along a circumference of the second opening 45. In some embodiments, the first opening 30 includes a first vertical edge 125, a second vertical edge 130, a first lateral edge 135 and a second lateral edge 145, the first channel 115 disposed on the first vertical edge 125, the second vertical edge 130, and the first lateral edge 135. The second opening 45 includes a first vertical edge 225, a second vertical edge 230, a first lateral edge 235, and a second lateral edge 245, the second channel 215 disposed on the first vertical edge 225, the second vertical edge 230, and the first lateral edge 235. In some embodiments, an advantage of the first channel 115 and the second channel 215 can be, but not limited to, diverting water around each of the first opening 30 and the second opening 45 to prevent water from coming into contact with live electrical components and to prevent a user from inserting a foreign object between enclosures and coming into contact with live electrical components.

In some embodiments, the first channel 115 is formed by the first vertical edge 125, the second vertical edge 130, and the first lateral edge 135 of the third opening 110, wherein the ends of the first vertical edge 125, the second vertical edge 130, and the first lateral edge 135 are joined together such that the first channel 115 forms a continuous channel around the third opening 110.

In some embodiments, the second channel 215 is formed by the first vertical edge 225, the second vertical edge 230, and the first lateral edge 235 of the fourth opening 210, wherein the ends of the first vertical edge 225, the second vertical edge 230, and the first lateral edge 235 are joined together such that the second channel 215 forms a continuous channel around the fourth opening 210.

Figure 4A:
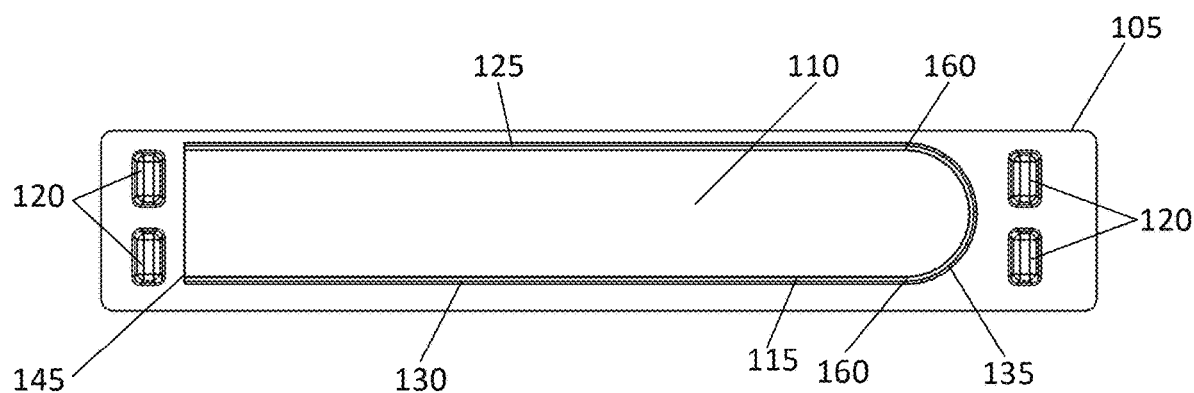
FIG. 4A is a front view of the first ganging member, according to some embodiments.
Figure 4B:
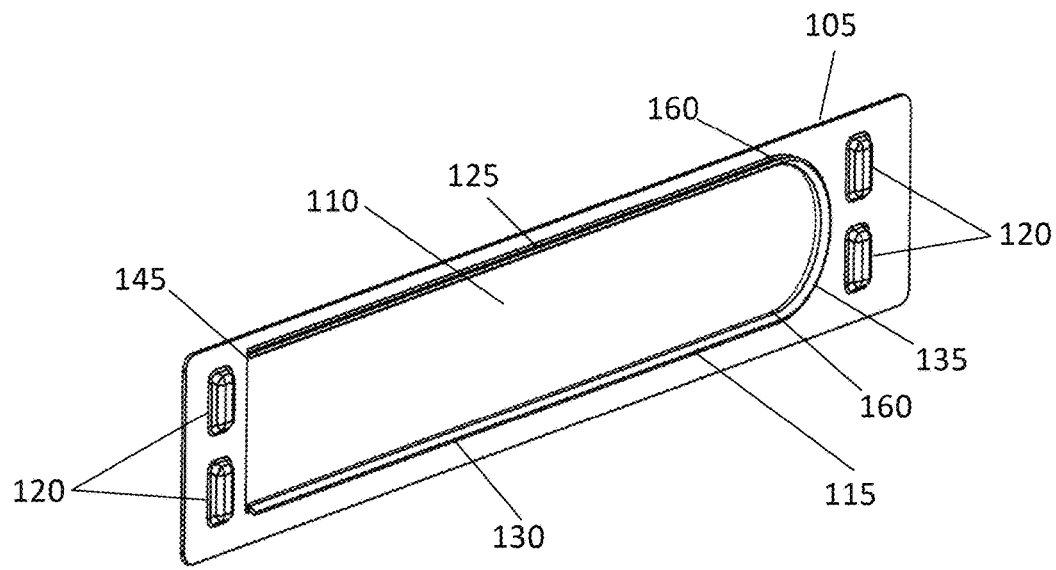
FIG. 4B is a perspective view of the first ganging member, according to some embodiments.
Figure 5:
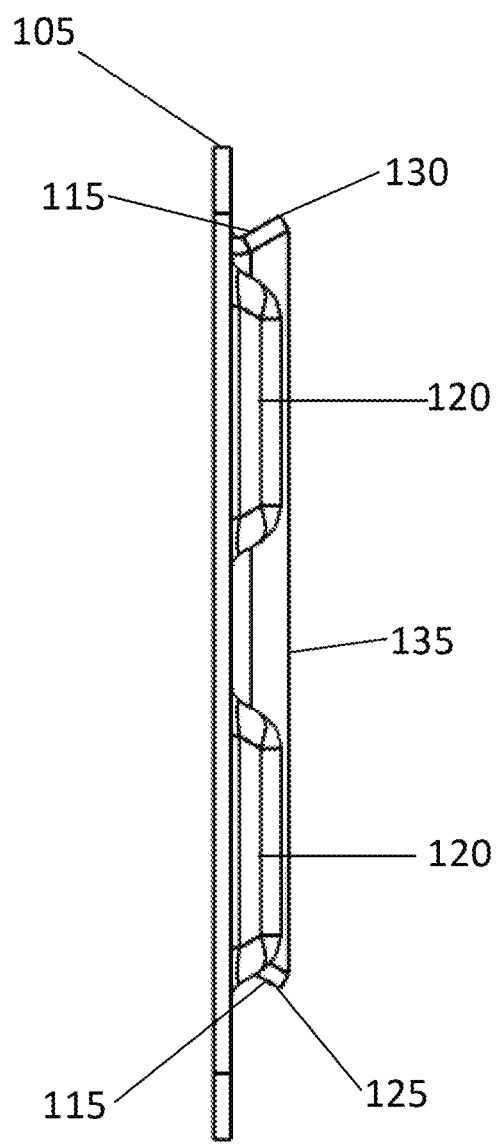
FIG. 5 is a top view of the first ganging member, according to some embodiments.
Figure 6:
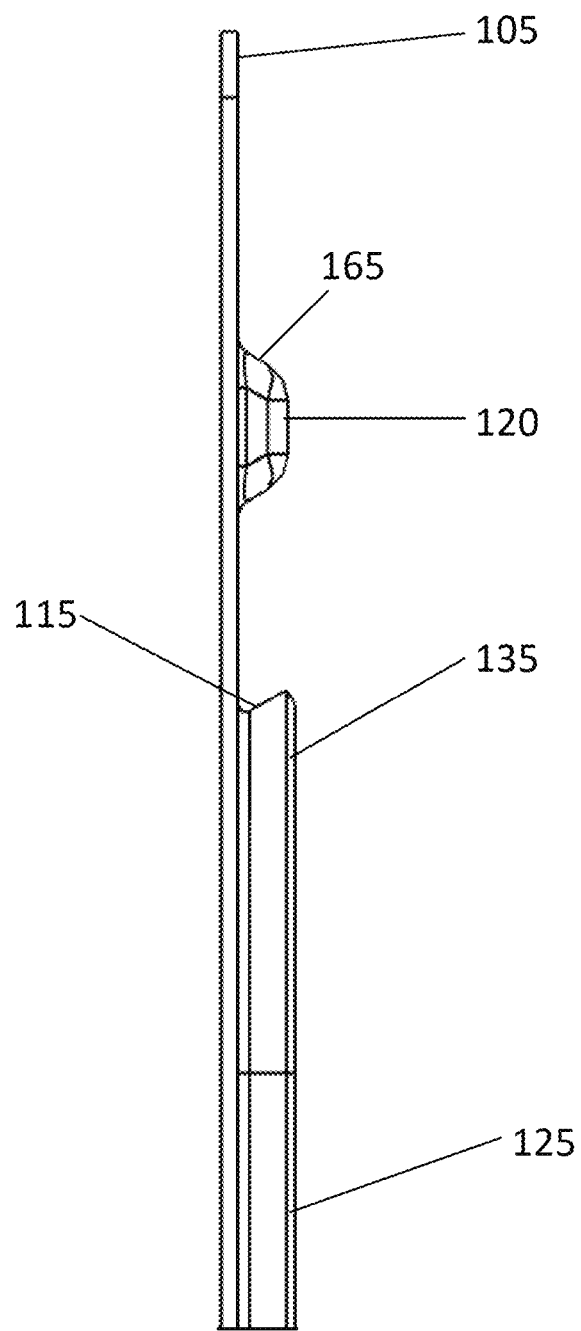
FIG. 6 is a partial side view of the first ganging member, according to some embodiments.

FIGS. 4A, 4B, 5, and 6 show different views of the first ganging member 105, according to some embodiments. FIG. 4A is a front view of the first ganging member 105, according to some embodiments. FIG. 4B is a perspective view of the first ganging member 105, according to some embodiments. FIG. 5 is a top view of the first ganging member 105, according to some embodiments. FIG. 6 is a partial side view of the first ganging member 105, according to some embodiments. FIGS. 4A-6 will be discussed generally, unless specific reference is made to a particular figure.

In some embodiments, the first channel 115 is disposed along a circumference of the third opening 110. In some embodiments, the third opening 110 includes a first vertical edge 125, a second vertical edge 130, a first lateral edge 135, and a second lateral edge 145, wherein the first channel 115 contiguously runs along the first vertical edge 125, the second vertical edge 130, and the first lateral edge 135. In some embodiments, the first lateral edge 135 of the first ganging member 105 is inclined, such that one of the first vertical edge 125 and the second vertical edge 130 is longer than the other of the first vertical edge 125 and the second vertical edge 130. In some embodiments, the first lateral edge 135 can be rounded.

In some embodiments, the first vertical edge 125, the first lateral edge 135, and the second vertical edge 130, which forms the first channel 115, can be connected, wherein the adjoining ends of the first vertical edge 125 to the first lateral edge 135 and the adjoining ends of the second vertical edge 130 to the first lateral edge 135 are connected to form a seam 160. In some embodiments, the seams 160 can be welded together. In some embodiments, the seam 160 can be joined together by tape, adhesive, joining compounds, sealants, other materials, and combinations thereof.

In some embodiments, the first channel 115 is a third width extending from the first ganging member 105. In some embodiments, the first channel 115 can be formed by flanging the edges of the first vertical edge 125, the second vertical edge 130, and the first lateral edge 135, with the adjoining ends of the first vertical edge 125, the second vertical edge 130, and the first lateral edge 135 being bridged together to form a contiguous channel, such as by welding or other joining methods.

In some embodiments, the first channel 115 can be attached to the third opening 110 of the first ganging member 105. For example, the first channel 115 can be welded onto the first ganging member 105 at the third opening 110.

In some embodiments, the pair of first protrusions 120 are disposed at a first end and a second end of the first ganging member 105, at opposite ends of the third opening 110. In some embodiments, the pair of first protrusions 120 is a first pair of first protrusions 120 and a second pair of first protrusions 120 disposed at opposite ends of the third opening 110. In some embodiments, the pair of first protrusions 120 are a first width 165 extending from a surface of the first ganging member 105.

Figure 7A:
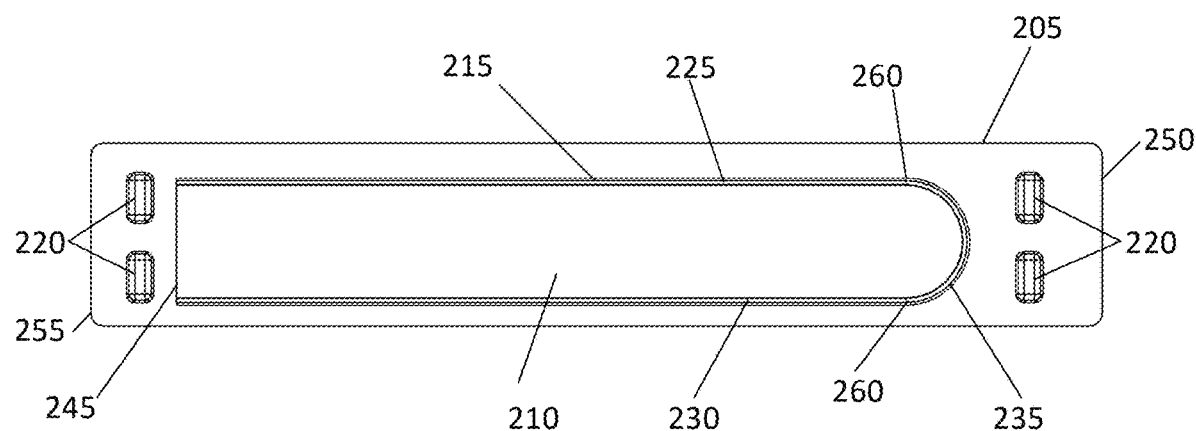
FIG. 7A is a front view of the second ganging member, according to some embodiments.
Figure 7B:
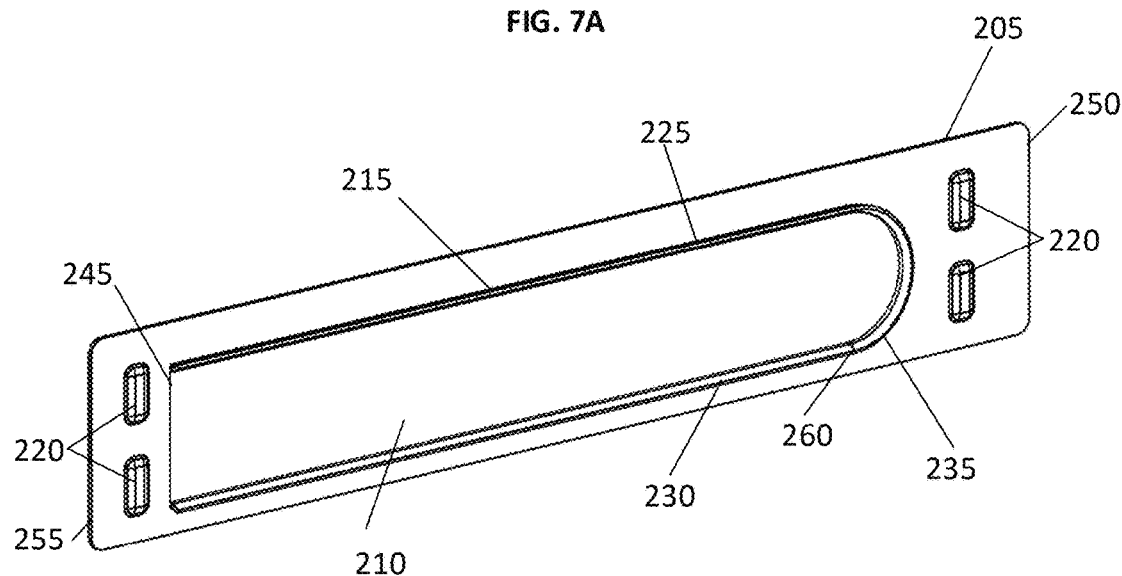
FIG. 7B is a perspective view of the second ganging member, according to some embodiments.
Figure 8:
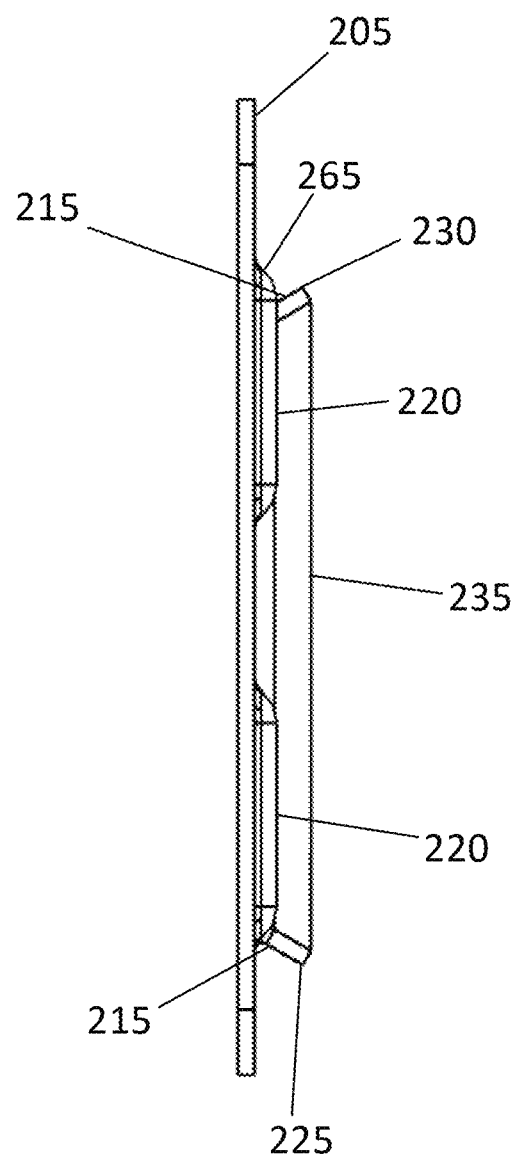
FIG. 8 is a top view of the second ganging member, according to some embodiments.

FIGS. 7A, 7B, and 8 show different views of the second ganging member 205 of FIG. 2, according to some embodiments. FIG. 7A is a front view of the second ganging member 205, according to some embodiments. FIG. 7B is a perspective view of the second ganging member 205, according to some embodiments. FIG. 8 is a top view of the second ganging member 205, according to some embodiments. FIGS. 7A-8 will be discussed generally, unless specific reference is made to a particular figure.

In some embodiments, the second channel 215 is disposed along a circumference of the fourth opening 210. In some embodiments, the fourth opening 210 includes a first vertical edge 225, a second vertical edge 230, a first lateral edge 235, and a second lateral edge 245, wherein the second channel 215 contiguously runs along the first vertical edge 225, the second vertical edge 230, and the first lateral edge 235. In some embodiments, the first lateral edge 235 of the second ganging member 205 is inclined, such that one of the first vertical edge 225 and the second vertical edge 230 is longer than the other of the first vertical edge 225 and the second vertical edge 230. In some embodiments, the first lateral edge 235 can be rounded.

In some embodiments, the first vertical edge 225, the first lateral edge 235, and the second vertical edge 230, which forms the first channel 215, can be connected, wherein the adjoining ends of the first vertical edge 225 to the first lateral edge 235 and the adjoining ends of the second vertical edge 230 to the first lateral edge 235 are connected to form a seam 260. In some embodiments, the seams 260 can be welded together. In some embodiments, the seam 260 can be joined together by tape, adhesive, joining compounds, sealants, other materials, and combinations thereof.

In some embodiments, the second channel 215 is a third width extending from the second ganging member 205. In some embodiments, the second channel 215 can be formed by flanging the edges of the first vertical edge 225, the second vertical edge 230, and the first lateral edge 235, with the adjoining ends of the first vertical edge 225, the second vertical edge 230, and the first lateral edge 235 being bridged together to form a contiguous channel, such as by welding or other joining methods.

In some embodiments, the second channel 215 can be attached to the fourth opening 210 of the second ganging member 205. For example, the second channel 215 can be welded onto the second ganging member 205 at the fourth opening 210.

In some embodiments, the pair of second protrusions 220 are disposed at a first end and a second end of the second ganging member 205, at opposite ends of the fourth opening 210. In some embodiments, the pair of second protrusions 220 is a first pair of second protrusions 220 and a second pair of second protrusions 220 disposed at opposite ends of the fourth opening 210. In some embodiments, the pair of second protrusions 220 are a second width 265 extending from a surface of the second ganging member 205.

Figure 9:
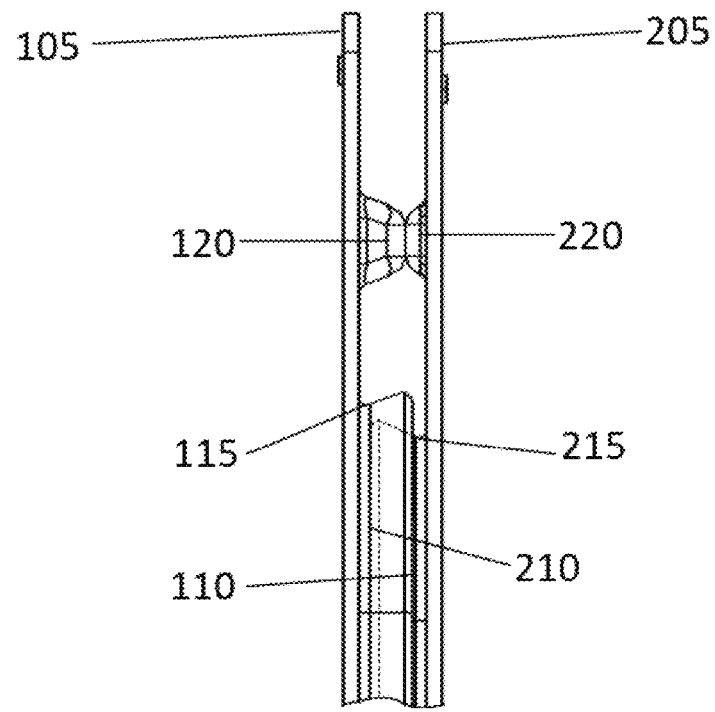
FIG. 9 is a side view of the first ganging member and the second ganging member, according to some embodiments.
Figure 9:
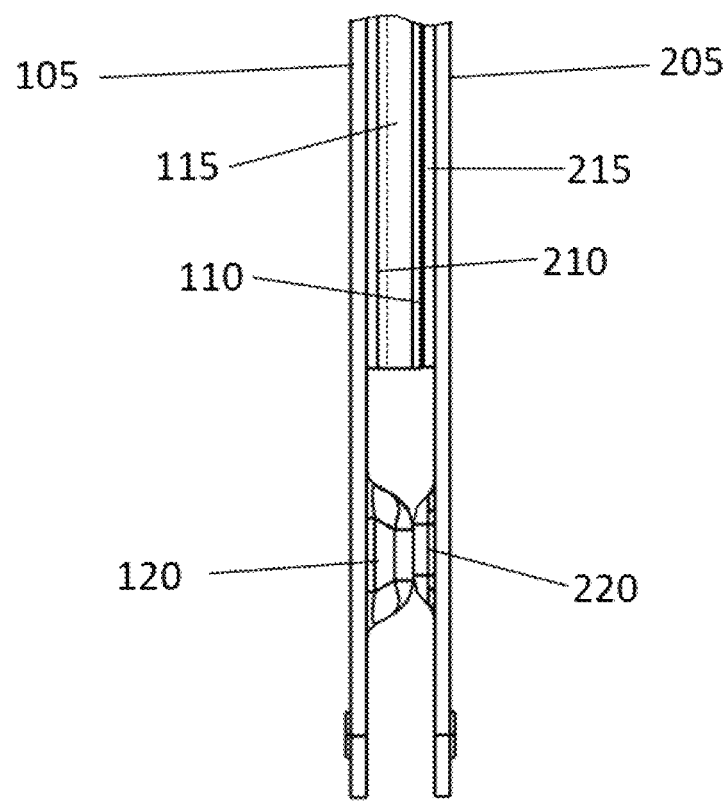

FIG. 9 is a side view of the first ganging member 105 and the second ganging member 205, according to some embodiments.

In some embodiments, the enclosure 20 can be a first enclosure 20 and a second enclosure 20, each of the first enclosure 20 and the second enclosure 20 having a first ganging member 105 and a second ganging member 205 disposed on a first side 25 and a second side 40 of the first enclosure 20 and a second enclosure 20.

In some embodiments, the first enclosure 20 is configured to adjoin the second enclosure 20, such that the first ganging member 105 of the first enclosure 20 or the second enclosure 20 aligns with the second ganging member 205 of the first enclosure 20 or the second enclosure 20. In some embodiments, when the first ganging member 105 is aligned with the second ganging member 205 such that the first ganging member 105 abuts the second ganging member 205, the pair of first protrusions 120 of the first ganging member 105 is configured to abut the pair of second protrusions 220 of the second ganging member 205. Consequently, in some embodiments, when the first ganging member 105 abuts the second ganging member 205, the second channel 215 is positioned within the first channel 115 and the third opening 110 without coming into contact with the first channel 115. Thus, the first channel 115 overlaps the second channel 215. In some embodiments, an advantage of the profile of the first channel 115 and the second channel 215 can be, but not limited to, providing a physical barrier between the first enclosure 20 and the second enclosure 20 to prevent an object from intruding into the space between the first enclosure 20 and the second enclosure 20 at the third opening 110 and the fourth opening 210 to protect from coming into contact with electrical components that traverse between adjoining enclosures 20.

In some embodiments, the pair of first protrusions 120 and the pair of second protrusions 220 can be different heights to position one of the first ganging member 105 and the second ganging member 205 in relation to the other of the first ganging member 105 and the second ganging member 205 when multiple enclosures are adjoined together. In some embodiments, the pair of first protrusions 120 and the pair of second protrusions 220 can be the same height to position the first ganging member 105 and the second ganging member 205 in relation to the other when multiple enclosures are adjoined together.

In some embodiments, the pair of first protrusions 120 is a first pair of first protrusions 120 and a second pair of first protrusions 120, and the pair of second protrusions 220 is a first pair of second protrusions 220 and a second pair of second protrusions 220. The first pair of first protrusions 120 can be disposed at a first end of the first ganging member 105, at one end of the third opening 110. The second pair of first protrusions 120 can be disposed at a second end of the first ganging member 105, at the opposite end of the third opening 110 from the first pair of first protrusions 120. The first pair of second protrusions 220 can be disposed at a first end of the second ganging member 205, at one end of the fourth opening 210. The second pair of second protrusions 220 can be disposed at a second endo of the second ganging member 205, at the opposite end of the fourth opening 210 from the first pair of second protrusions 220.

The terminology used herein is intended to describe embodiments and is not intended to be limiting. The terms "a," "an," and "the" include the plural forms as well, unless clearly indicated otherwise. The terms "comprises" and/or "comprising," when used in this Specification, specify the presence of the stated features, integers, steps, operations, elements, and/or components, but do not preclude the presence or addition of one or more other features, integers, steps, operations, elements, and/or components.

It is to be understood that changes may be made in detail, especially in matters of the construction materials employed and the shape, size, and arrangement of parts without departing from the scope of the present disclosure. This Specification and the embodiments described are examples, with the true scope and spirit of the disclosure being indicated by the claims that follow.

The invention claimed is:

1. A device comprising:
an enclosure,
wherein the enclosure includes:
a first side,
a second side,
a first opening,
wherein the first opening is disposed on the first side, and
a second opening,
wherein the second opening is disposed on the second side;
a first ganging member,
wherein the first ganging member includes:
a third opening,
a first channel, and
a pair of first protrusions,
wherein the first ganging member is disposed on the first side of the enclosure; and
a second ganging member,
wherein the second ganging member includes:
a fourth opening,
a second channel, and
a pair of second protrusions,
wherein the second ganging member is disposed on the second side of the enclosure;
wherein the first channel is disposed along a portion of a circumference of the third opening, and the second channel is disposed along a portion of a circumference of the fourth opening;
wherein the third opening and the fourth opening further includes:
a first vertical edge,
a second vertical edge,
a first lateral edge, and
a second lateral edge,
wherein the first vertical edge, the first lateral edge, and the second vertical edge of the third opening are flanged to contiguously form the first channel,
wherein the first vertical edge, the first lateral edge, and the second vertical edge of the fourth opening are flanged to contiguously form the second channel.

2. The device of claim 1,
wherein the first lateral edge of the third opening and the first lateral edge of the fourth opening are inclined such that a first end of the lateral edge is higher than a second end of the lateral edge.

3. The device of claim 1,
wherein the first lateral edge of the third and fourth openings is rounded.

4. The device of claim 1, wherein the pair of first protrusions is a first pair of first protrusions and a second pair of first protrusions, the first pair of first protrusions and the second pair of first protrusions disposed at opposite ends of the third opening, and the pair of second protrusions is a first pair of second protrusions and a second pair of second protrusions, the first pair of second protrusions and the second pair of second protrusions disposed at opposite ends of the fourth opening.

5. The device of claim 4, wherein the pair of first protrusions extend from the first ganging member at a first width, and the pair of second protrusions extend from the second ganging member at a second width.

6. The device of claim 5, wherein the enclosure comprises:
a first enclosure, and
a second enclosure,
wherein the first or second ganging member of the first enclosure is configured to abut an other of the first or second ganging member of the second enclosure.

7. The device of claim 6, wherein the pair of first protrusions or the pair of second protrusions of the first enclosure abuts the other of the pair of first protrusions or the pair of second protrusions of the second enclosure to align the first enclosure to the second enclosure, wherein the first channel or the second channel of the first enclosure overlaps the other of the first channel or the second channel of the second enclosure such that the second channel sits in the first opening without contacting the first channel.

8. The device of claim 6, wherein the enclosure further includes:
   a pair of first receptacles,
      wherein the pair of first receptacles is disposed at opposite ends of the first opening, and
   a pair of second receptacles,
      wherein the pair of second receptacles is disposed at opposite ends of the second opening,
   wherein the pair of first receptacles and the pair of second receptacles are configured to receive a connector to gang the first enclosure to the second enclosure.

9. An apparatus comprising:
   an enclosure,
      wherein the enclosure includes:
         a first side,
            wherein the first side includes:
               a first opening,
                  wherein the first opening is disposed on the first side to expose an interior of the enclosure,
               a first channel,
                  wherein the first channel is disposed along a circumference of the first opening, and
               at least two first protrusions,
                  wherein the at least two first protrusions are disposed at opposite sides of the first opening; and
         a second side,
            wherein the second side includes:
               a second opening,
                  wherein the second opening is disposed on the second side to expose an interior of the enclosure,
               a second channel,
                  wherein the second channel is disposed along a circumference of the second opening, and
               at least two second protrusions,
                  wherein the at least two second protrusions are disposed at opposite sides of the second opening;
      wherein the first opening and the second opening further includes:
         a lateral edge,
            wherein the lateral edge of the first opening and a lateral edge of the second opening are inclined such that a first end of the lateral edge of the first and second openings is higher than a second end of the lateral edge of the first and second openings.

10. The apparatus of claim 9,
   wherein the lateral edge of the first and second openings is rounded.

11. The apparatus of claim 9, wherein the first channel is disposed along a portion of the first opening, and the second channel is disposed along a portion the second opening.

12. The apparatus of claim 11, wherein the first opening and the second opening further includes:
   a first vertical edge,
   a second vertical edge,
   a first lateral edge, and
   a second lateral edge,
   wherein the first vertical edge, the first lateral edge, and the second vertical edge of the first opening are flanged to contiguously form the first channel,
   wherein the first vertical edge, the first lateral edge, and the second vertical edge of the second opening are flanged to contiguously form the second channel.

13. The apparatus of claim 9, wherein the at least two first protrusions is a first pair of first protrusions and a second pair of first protrusions, the first pair of first protrusions and the second pair of first protrusions disposed at opposite ends of the first opening, and the at least two second protrusions is a first pair of second protrusions and a second pair of second protrusions, the first pair of second protrusions and the second pair of second protrusions disposed at opposite ends of the second opening.

14. The apparatus of claim 13, wherein the at least two first protrusions extend from the first side at a first width, and the pair of second protrusions extend from the second side at a second width.

15. The apparatus of claim 14, wherein the enclosure comprises:
   a first enclosure, and
   a second enclosure,
      wherein the first or second side of the first enclosure is configured to abut an other of the first or second side of the second enclosure.

16. The apparatus of claim 15, wherein the at least two first protrusions or the at least two second protrusions of the first enclosure abuts the other of the at least two first protrusions or the at least two second protrusions of the second enclosure to align the first enclosure to the second enclosure, wherein the first channel or the second channel of the first enclosure overlaps the other of the first channel or the second channel of the second enclosure such that the second channel sits in the first opening without contacting the first channel.

17. The apparatus of claim 15, wherein the enclosure further includes:
   a pair of first receptacles,
      wherein the pair of first receptacles is disposed at opposite ends of the first opening, and
   a pair of second receptacles,
      wherein the pair of second receptacles is disposed at opposite ends of the second opening,
   wherein the pair of first receptacles and the pair of second receptacles are configured to receive a connector to gang the first enclosure to the second enclosure.

\* \* \* \* \*